(12) United States Patent
Hassanzadeh et al.

(10) Patent No.: US 11,722,503 B2
(45) Date of Patent: Aug. 8, 2023

(54) RESPONSIVE PRIVACY-PRESERVING SYSTEM FOR DETECTING EMAIL THREATS

(71) Applicant: Accenture Global Solutions Limited, Dublin (IE)

(72) Inventors: Amin Hassanzadeh, Arlington, VA (US); Benjamin Glen McCarty, Washington, DC (US)

(73) Assignee: Accenture Global Solutions Limited, Dublin (IE)

( * ) Notice: Subject to any disclaimer, the term of this patent is extended or adjusted under 35 U.S.C. 154(b) by 339 days.

(21) Appl. No.: 16/867,521

(22) Filed: May 5, 2020

(65) Prior Publication Data

US 2021/0352093 A1 Nov. 11, 2021

(51) Int. Cl.
*H04L 29/06* (2006.01)
*H04L 9/40* (2022.01)
*G06N 20/00* (2019.01)
*G06F 21/62* (2013.01)
*H04L 51/212* (2022.01)

(52) U.S. Cl.
CPC ...... *H04L 63/1425* (2013.01); *G06F 21/6245* (2013.01); *G06N 20/00* (2019.01); *H04L 51/212* (2022.05)

(58) Field of Classification Search
CPC .............. H04L 63/1425; H04L 51/212; H04L 63/1433; G06N 20/00; G06F 21/6245
See application file for complete search history.

(56) References Cited

U.S. PATENT DOCUMENTS

| 2007/0208856 A1* | 9/2007 | Rounthwaite | G06Q 10/107 |
| | | | 709/225 |
| 2016/0156577 A1* | 6/2016 | Alspector | H04L 51/212 |
| | | | 709/206 |
| 2019/0349400 A1* | 11/2019 | Bruss | G06F 21/53 |
| 2021/0097395 A1* | 4/2021 | Ocher | G06K 9/6256 |

* cited by examiner

*Primary Examiner* — Yogesh Paliwal
(74) *Attorney, Agent, or Firm* — Norton Rose Fulbright US LLP

(57) ABSTRACT

Embodiments of the present disclosure provide centralized and coordinate learning techniques for identifying malicious e-mails while maintaining privacy of the analyzed e-mails of different organizations. One or more models may be generated and configured to construct feature sets that may be used to characterize e-mails as malicious or safe. Feedback associated with one or more models trained by a first organization (and other organizations) may be shared with a modelling device to modify parameters of the one or more models, where the modified parameters are configured to improve identification of malicious e-mail threats. The feedback provided by the first organization may not include e-mails received by the first organization, thereby enabling the privacy of the e-mails received by the first organization to be maintained in an confidential manner even though the updated parameters may be shared with a second organization.

20 Claims, 7 Drawing Sheets

RESPONSIVE PRIVACY-PRESERVING SYSTEM FOR DETECTING EMAIL THREATS

TECHNICAL FIELD

The present application relates to e-mail filtering and more specifically to distributed techniques for identifying malicious e-mails while maintaining data privacy.

BACKGROUND

Malicious e-mails present a significant challenge to many different individuals and entities. For example, malicious users may send phishing e-mails to individuals in an attempt to have the recipients provide financial information, such as credit card or bank account information. Additionally, phishing e-mails may also be sent to employees of businesses in an attempt to have the employees provide confidential information of the business or other malicious purposes. In addition to phishing-type e-mails, malicious e-mails may also include spam e-mails, e-mails containing malicious links (e.g., links to nodes of a botnet or other malicious web sites), malicious software (e.g., spyware, malware, ransomware, etc.), or other types of malicious content.

Presently, malicious e-mail content is identified using primarily two different techniques. The first technique utilizes e-mail gateways, which are appliances that receive e-mails to identify malicious e-mails via inspection of received e-mails for malicious content. For example, an e-mail gateway may inspect received e-mails to determine whether an e-mail has sender policy framework forged, missing correct beacon keys for signing, or an e-mail that is allegedly sent by a member of the organization (i.e., an e-mail that should have originated within the organization), but that is received by the e-mail gateway from an external source. The second technique may utilize threat intelligence data feeds to filter out e-mail content using a blacklist of known malicious content. The threat intelligence data feeds may be generated by third party organizations, such as anti-virus companies or other industry participants. The data feeds may include a hash of known malicious e-mails, a list of e-mail addresses known to be used in malicious e-mails, information regarding links or attachments that may be included in e-mails and are known to lead to malicious web content, or other similar types of information. The threat intelligence data feeds may be viewed as a blacklist (or multiple blacklists) that may be compared against certain e-mail content to identify malicious e-mail content.

While the techniques described above may be successfully deployed to mitigate many malicious e-mails, the above-described techniques suffer from several drawbacks. One drawback is that these techniques are slow and reactionary. For example, the above-described techniques must wait for new types of malicious e-mails to be discovered before they can perform filtering, which often means that malicious e-mails are initially allowed to be sent to users and may only be discovered as malicious (and subsequently blocked) after at least some users have been affected by the malicious content of emerging malicious e-mail campaigns.

Another deficiency in current e-mail filtering systems and techniques is that malicious e-mail campaigns are often targeted to specific individuals (or groups of individuals), business, industries, and regions. This means that entities involved in combatting malicious e-mails, such as information technology (IT) teams, antivirus companies, and other threat intelligence groups, may not see the same malicious e-mail threats. The diversity of malicious e-mail campaigns makes it difficult to create a universal way to identify malicious e-mails. To illustrate, a first malicious e-mail campaign may target a first entity and a second malicious e-mail campaign may target a second entity. The first and second malicious e-mail campaigns may have different characteristics and it may take some time to distribute information to the network infrastructure (e.g., e-mail gateways and threat intelligence data feeds) used by the first entity to enable the first entity to identify malicious e-mails associated with the second campaign and vice-versa. The delays in sharing this information create windows of time in which the second entity may be vulnerable to the first malicious e-mail campaign and the first entity may be vulnerable to the second malicious e-mail campaign.

Another drawback created by targeted e-mail campaigns is that it may result in improper labelling of e-mails as malicious when they are not, or labelling of e-mails as not malicious when they are. For example, an e-mail containing a set of keywords or other content (e.g., links) may be identified as malicious based on a set of rules that are used to identify malicious e-mails by an organization, but that e-mail may actually be of interest to some users of the organization. Due to the one-size fits all nature of the rules used to identify malicious e-mails, these e-mails may not be received by the users to which the e-mails may be of interest, such as a user in a research department. Thus, while labelling the e-mail as malicious may appropriately prevent some users from receiving the e-mail, such as users in a finance department, it may prevent reception of the e-mails by users that actually should be receiving the e-mail.

SUMMARY

The present application discloses systems, methods, and computer-readable storage media for performing distributed identification of malicious e-mails while maintaining data privacy. The techniques disclosed herein utilize machine learning techniques in a cooperative environment that allows training of models to be performed locally by different entities and feedback derived during the training may be used to update the model(s) or generate new models that may provide a more comprehensive tool for identifying malicious e-mails. For example, an initial model or set of models may be distributed to a first entity and a second entity. A first instance of the model may be trained using the e-mails received by the first entity and a second instance of the model may be trained using the e-mails received by the second entity. Training the model(s) separately using input data sets derived from the e-mails of the first and second entities enables the models to account for differences in malicious e-mail campaigns (e.g., malicious e-mail campaigns targeting the first entity may be different from malicious e-mail campaigns targeting the second entity), thereby overcoming at least one of the drawbacks of previous malicious e-mail identification tools and techniques.

Feedback derived by the training of the models by the first and second entities and their different data sets may be provided to a modelling device (e.g., a device that generates and distributes malicious e-mail identification models in accordance with aspects of the present disclosure), where the feedback may be used to update the model or generate a new model that accounts for malicious e-mail identified by the first and second entities. The updated or new models may be redistributed to the first and second entities and may enable these different entities to more efficiently identify malicious e-mails. For example, the new or updated model may enable the first entity to identify malicious e-mails sharing characteristics of the malicious e-mail campaign targeting the second entity and enable the second entity to identify malicious e-mails sharing characteristics of the malicious e-mail campaign targeting the first entity. Such capabilities represent an improved capability for identifying malicious e-mails, especially due to the targeting of malicious e-mail campaigns to specific entities. Moreover, the above-described techniques may be performed without requiring different entities to share e-mail data, thereby maintaining the privacy of each entities e-mail data.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed methods and apparatuses, reference should be made to the implementations illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Embodiments of the present disclosure provide systems, methods, and computer-readable storage media facilitating distributed learning techniques configured to improve detection of malicious e-mails while maintaining the privacy of e-mail contents. The disclosed embodiments utilize machine learning techniques to develop and train models that may be distributed to one or more different entities to identify malicious e-mails, such as to label received e-mails as malicious or safe. Feedback may be generated during training of the models and the feedback may be provided to a modelling device (e.g., a device that generates and distributes the models). The modelling device may use the feedback to refine model parameters and update the models (or generate a new model), which may be subsequently distributed to the entities for use in identifying malicious e-mails. The disclosed techniques enable large sample sizes to be used to train models and refine them over time without requiring different entities to share e-mail data between each other (or with the modelling device), thereby maintaining the confidentiality and privacy of the e-mail data of each entity.

Figure 1:
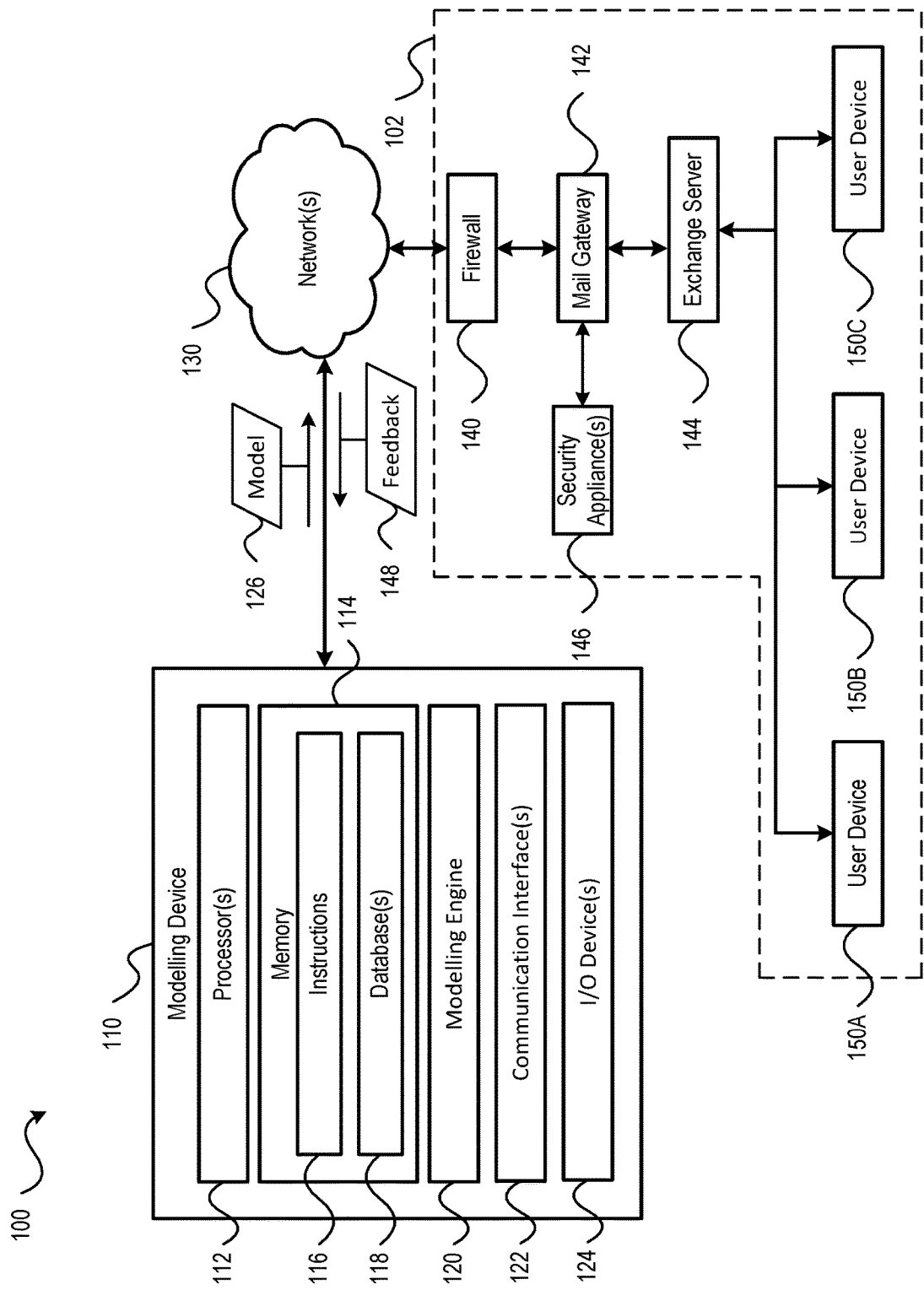
FIG. 1 is a block diagram of a system providing distributed techniques for identifying malicious e-mails while maintaining data privacy in accordance with embodiments of the present disclosure.

Referring to FIG. 1, a system providing distributed techniques for identifying malicious e-mails while maintaining data privacy in accordance with embodiments of the present disclosure is shown as a system 100. The system 100 may be configured to generate models for identifying malicious e-mails. The system 100 may distribute the models to various third party entities (e.g., individuals, businesses, etc.) for use in identifying malicious e-mails. Distribution of the models to different entities may enable distributed training of the model across a diverse set of input data (e.g., e-mails received by many different entities) without requiring sharing of the data sets (e.g., the e-mails) between the different entities, thereby maintaining data privacy with respect to each data set. As the models are used to identify malicious e-mails, each entity may provide feedback to the system 100, which may facilitate dynamic integrating of the entities' updated models to one global model. As the global model is updated based on received feedback, the updated global model may be redistributed for further use in identifying malicious e-mails, thereby providing a system that enables information for identifying malicious e-mails to be rapidly shared across different entities without sharing the data sets (e.g., e-mails) between the different entities.

As shown in FIG. 1, the system 100 includes a modelling device 110. The modelling device 110 includes one or more processors 112, a memory 114, a modelling engine 120, one or more communication interfaces 122, and one or more input/output (I/O) devices 124. The one or more processors 112 may include one or more microcontrollers, application specific integrated circuits (ASICs), field programmable gate arrays (FPGAs), central processing units (CPUs) having one or more processing cores, or other circuitry and logic configured to facilitate the operations of the modelling device 110 in accordance with aspects of the present disclosure. The memory 114 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the modelling device 110 may be stored in the memory 114 as instructions 116 that, when executed by the one or more processors 112, cause the one or more processors 112 to perform the operations described herein with respect to the modelling device 110, as described in more detail below. Additionally, the memory 114 may be configured to store one or more databases 118. Exemplary aspects of the one or more databases 118 are described in more detail below.

The one or more communication interfaces 122 may be configured to communicatively couple the modelling device 110 to one or more networks 130 via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, and an IEEE 802.16 protocol, a 3rd Generation (3G) communication standard, a 4th Generation (4G)/long term evolution (LTE) communication standard, a 5th Generation (5G) communication standard, and the like). The one or more input/output I/O devices 124 may include one or more display devices, a keyboard, a stylus, one or more touchscreens, a mouse, a trackpad, a camera, one or more speakers, haptic feedback devices, or other types of devices that enable a user to receive information from or provide information to the modelling device 110.

The modelling engine 120 may be configured to generate and modify models configured to identify malicious e-mails (e.g., spam e-mails, phishing e-mails, and the like). The models generated by the modelling engine 120 may be configured to analyze e-mail data based on one or more features to identify or label the emails (e.g., a label identifying an e-mail as malicious or non-malicious). Exemplary features of the e-mails that may be analyzed by the models generated by the modelling engine 120 may include Internet Protocol (IP) addresses; e-mail addresses (e.g., a sender e-mail address and/or one or more recipient e-mail addresses); a size of the e-mail (and/or attachments to the e-mail); one or more keywords present in the e-mail; a subject of the e-mail (e.g., as may be presented in the subject portion of the e-mail); one or more x-headers; formatting information; extension or file type information associated with one or more attachments (e.g., ".exe," ".doc," ".docx," ".js," ".vbs," ".pdf," ".sfx," ".bat," and ".dll," or other file extensions); backscatter information; mail client information; and zero or more hyperlinks included in the e-mail(s). It is noted that the exemplary features identified above have been provided for purposes of illustration, rather than by way of limitation and other features may be analyzed by models generated in accordance with embodiments of the present disclosure to identify or classify malicious e-mails. Exemplary features that may be analyzed using the models distributed by the modelling device 110 may be found in different portions of a received e-mail.

Figure 4B:
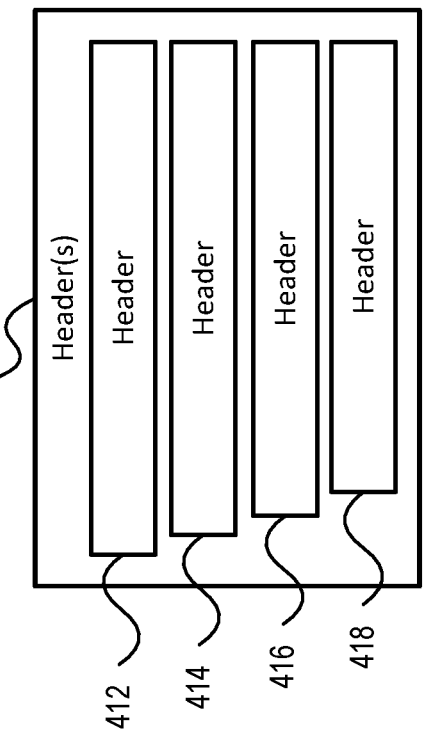
FIG. 4B is a block diagram illustrating aspects of headers utilized to analyze e-mails in accordance with embodiments of the present disclosure.
Figure 4C:
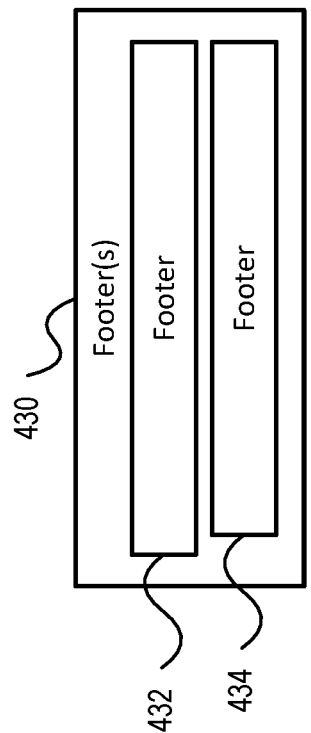
FIG. 4C is a block diagram illustrating aspects of footers utilized to analyze e-mails in accordance with embodiments of the present disclosure.
Figure 4A:
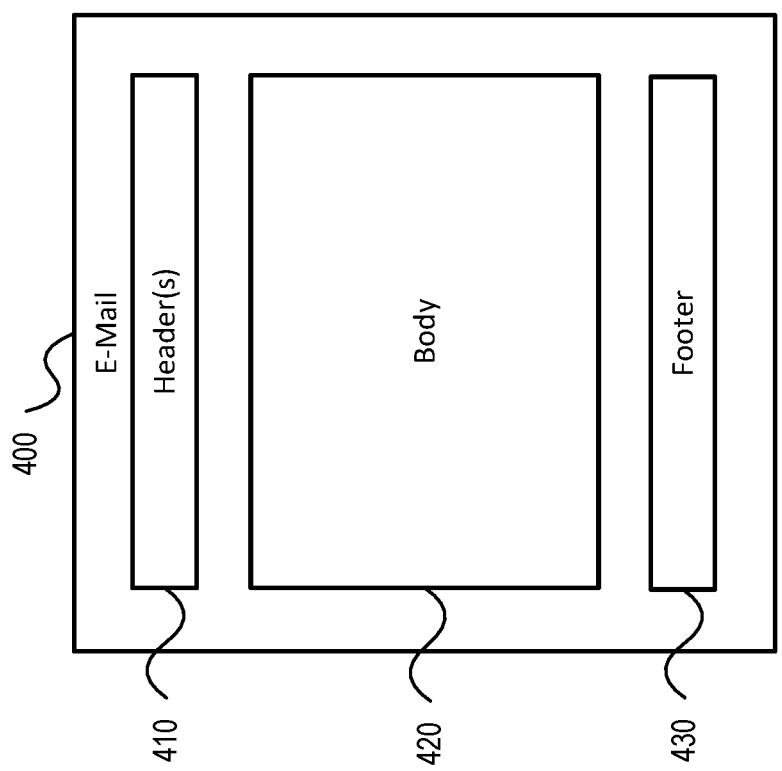
FIG. 4A is a block diagram illustrating aspects of an e-mail structure utilized to analyze e-mails in accordance with embodiments of the present disclosure.

For example and referring to FIGS. 4A-4C, various block diagrams processing aspects of an e-mail structure including features that may be used to identify malicious e-mails in accordance with embodiments of the present disclosure are shown. As shown in FIG. 4A, an e-mail 400 may include a header portion 410, a body portion 420, and a footer portion 430. The header portion 410 may include information regarding a sender (e.g., a sender e-mail address) of the e-mail 400, one or more intended recipients (e.g., one or more recipient e-mail addresses) of the e-mail 400, a date of the e-mail 400, a subject of the e-mail 400, one or more individuals that are copied on the e-mail (e.g., one or more recipient e-mail addresses included in a cc: portion of the e-mail), or other information (e.g., timestamps, forwarding information, etc.). As shown in FIG. 4B, the header portion 410 may include a plurality of header fields 412, 414, 416, 418. Some of the header fields 412, 414, 416, 418 may be used for standard e-mail header data, such as information regarding the sender, recipients, users copied on the e-mail, the subject, the date, and the like. Other header fields included in the e-mail 400 may be utilized to include routing information for the e-mail 400. For example, as the e-mail is routed from the source to the destination, one or more mail transfer agents (MTAs) may be utilized to forward the e-mail through a network. Each of the MTAs may append a date/timestamp to the e-mail indicating the MTA has received and forwarded the e-mail (e.g., to another node in the network). The header information may be specified in plaintext. An exemplary e-mail header may be as follows:

```
MIME-Version: 1.0
Date: Fri, 3 Apr 2020 19:31:33 –0400
Message-ID: <CAF26bYqpToNmyy5rDL9tcuvEANFPc88Yi3g=K
nJdDnZUH14X8Q@mail.mail123.com>
Subject: Conference meeting invitation - Test
From: John Smith <JohnSmith12345@mail123.com>
To: Jane Doe <JaneDoe12345@mail123.com>
Content-Type: multipart/mixed; boundary="00000000000053b2dc
05a26b5176"
--00000000000053b2dc05a26b5176
Content-Type: multipart/alternative; boundary="00000000000053b
2d905a26b5174"
--00000000000053b2d905a26b5174
Content-Type: text/plain; charset="UTF-8"
```

The body portion 420 of the e-mail 400 may include the e-mail message contents, such as one or more sentences intended to convey information to the recipient(s). The body portion 420 may be specified in plaintext, but may include metadata or other information. For example, metadata may be used to provide formatting of text, such as to control the color of the font, the font size, spacing, accents (e.g., bold, italics, underline, etc.), etc. Additionally, the body portion 420 may include images, hyperlinks (e.g., uniform resource locators (URLs)), or other types of information. An exemplary e-mail body may be as follows:

```
John Smith is inviting you to a scheduled conference meeting.
Topic: Test
Time: This is a recurring meeting Meet anytime
Join Meeting
https://conferencemeeting123.us/x/1234567890
Meeting ID: 123 456 7890
```

As shown in FIG. 4C, the footer portion 430 may include a plurality of footer fields 432, 434 containing various types of information. An exemplary e-mail footer may be as follows:

---

--00000000000053b2d905a26b5174
Content-Type: text/html; charset="UTF-8"
Content-Transfer-Encoding: quoted-printable
<div dir=3D"auto">John Smith is inviting you to a scheduled meet=
ing.<br><br>Topic: Test<br>Time: This is a recurring meeting
Meet anytime=
<br><br>Join Meeting<br><a
href=3D"https://conferencemeeting123.us/x/12
34567890">https=
://conferencemeeting123.us/x/1234567890</a><br><br>Meeting
ID: 123 456 7890<br>=C2=A0</div>
--00000000000053b2d905a26b5174--
--00000000000053b2dc05a26b5176
Content-Type: text/calendar; charset="US-ASCII"; name="
Meeting.ics"
Content-Disposition: attachment; filename=" Meeting.ics"
Content-Transfer-Encoding: base64
X-Attachment-Id: 171426286f4494a316c1
Content-ID: <171426286f4494a316c1>
QkVHSU46VkNBTEVOREFSCIZFUlNJT046Mi4wCkJFR0lOOl
ZFVkVOVApDUkVBVEVEOjIwMjAwNDAzVDIzMzExNVoK
UlJVTEU6RlJFUT1XRUVLTFk7SU5URVJWQUw9MTtVTlRJT
D0yMDIwMDYwOVQyMjAwMDBaCkRFU0NSSVBUSU9OOk
FtaW4gSGFzc2FuemFkZWggaXMgaW52aXRpbmcgeW91IHRvI
GEgc2NoZWR1bGVkIFpvb20gbWVldGluZy5cblxuVG9waWM6
IFZJVkEwOFxuVGltZTogVGhpcyBpcyBhIHJlY3VycmluZyBtZ
WV0aW5nIE1lZXQgYW55dGltZVxuXG5Kb2luIFpvb20gTWVld
GluZ1xuaHR0cHM6Ly96b29tLnVzL2ovNjU4Mzk1MTE4MlxuX
G5NZWV0aW5nIElEOiA2NTggMzk1IDExODJcbgpEVEVORD
oyMDIwMDQwN1QyMjQwMDBaCkRUU1RBUlQ6MjAyMDA
0MDdUMjIwMDAwWgpMT0NBVElPVTjpodHRwczovL3pvb20u
dXMvai82NTgzOTUxMTgyClNVTU1BUlk7TEFOR1VBR0U9d
XMtRU46VklWQTA4ClVJRDowNDIzMDI3Ni03OTA0LTRkO
WUtYmE0OS1iZWU2NWIyYzc0ZTAKQkVHSU46VkFMQVJN
ClRSSUdHRV16LVBUMTBNCkFDVElPTjpESVNQTEFZCkRF
U0NSSVBUSU9OOlJlbWluZGVyCkVORDpWQUxBUk0KRU5
EOlZFVkVOVApFTkQ6VkNBTEVOREFS
--00000000000053b2dc05a26b5176--

---

It is noted that the various portions of the e-mail 400 illustrated in FIGS. 4A-4C and the example e-mail contents described above have been provided for purposes of illustration, rather than by way of limitation and that e-mails analyzed according to embodiments of the present disclosure may include other types of information or more or less fields and portions than are illustrated in FIGS. 4A-4C and the examples above. Referring back to FIG. 1, the modelling engine 120 may generate a model 126 and may transmit the model 126 to a first organization 102 via the one or more networks 130. The first organization 102 may be a business or other type of entity that may receive e-mail messages. As shown in FIG. 1, the organization 102 may include a network infrastructure that includes a firewall 140, a mail gateway 142, an exchange server 144, and one or more security appliances 146. The firewall 140 may be configured to protect a private network of the first organization 102, such as to prevent unauthorized access to one or more computing resources (e.g., database, computers, servers, services, etc.) of the private network. The mail gateway 142 may be configured to manage connections between different networks, which may include networks running different protocols (e.g., a transport control protocol/Internet protocol (TCP/IP) network and a simple network architecture (SNA) protocol). As part of the managing of the connections, incoming e-mail messages may be provided to the mail gateway 142 and outgoing e-mail messages may be transmitted (e.g., outside the private network of the first organization) to remote networks via the mail gateway 142. The exchange server 144 may be configured to store e-mail messages, including e-mails originating from within the first organization 102 as well as incoming e-mails received by the mail gateway 142. The functionality provided by the exchange server 144 may include composing e-mails, viewing e-mails, saving drafts of e-mails, managing calendars, or other functionality designed to support operations of a mail client application (e.g., Microsoft OUTLOOK®, GMAIL®, and the like).

The mail client applications may be provided by one or more user devices of the organization. For example, the organization 102 may include a plurality of user devices, including user device 150A, user device 150B, and user device 150C. It is noted that FIG. 1 illustrates the plurality of user devices as including 3 user devices for purposes of illustration, rather than by way of limitation and the embodiments of the present disclosure may be utilized with organizations having more than 3 user devices or less than 3 user devices. Further, it is noted that some users may have multiple user devices, such as a laptop or desktop computing device, a tablet computing device, a smartphone, a personal digital assistant, or other types of devices configured to provide users with access to e-mails.

The security appliance 146 may be configured to perform operations for training models generated by the modelling device 110, such as the model 126, and to provide feedback (e.g., feedback 148) to the modelling device 110. To illustrate, the model 126 may be received by the security appliance 146 via the one or more networks 130 and stored in a memory. Initially, the model 126 may be a raw model containing a set of parameters for labelling e-mails as malicious or safe. As e-mails are received by the mail gateway 142 the e-mails may be provided to the security appliance 146 and used to train the model 126. In an aspect, the model parameters may contain numeric values, which may be scores, rankings, probabilities, or other types of numeric representations of data. It is noted that the particular model parameters and the data types accepted as inputs by the models may depend on what classification/clustering machine learning algorithms are used. For example, where neural network models are utilized, the parameters may be biases (e.g., a bias vector/matrix) or weights and where regression-based machine learning algorithms the parameters may be differential values. Regardless of the particular type of machine learning algorithm(s) that are utilized, these hyperparameters may be used internally in the model according to the concepts disclosed herein.

During training of the model 126, the model parameters may converge to particular values over a training period. The particular amount of time associated with the training period may be an hour, 3 hours, 6 hours, 12 hours, 1 day, 3 days, five days, 1 week, multiple weeks (e.g., 2-3 weeks), 1 month, and the like. In one example the model may be trained using labeled data (e.g., a supervised training algorithm) where users, admins, or some other entity reviews every single email or a subset of e-mails and labels them as malicious or not-malicious to train the model. When an organization receives a raw global model until it may be fed some manually labeled data (known as training data set) and the model learns from that data. During the learning, the model's hyperparameters may be updated and adjusted, as explained above and the altered parameters may be sent as feedback. The feedback from that organization may be aggregated with feedback from other organizations (e.g., hyperparameters that have been updated and adjusted by other organizations) and the aggregated feedback may be used to generate an updated global model. The organization may receive another global copy of the global model that may be used to label emails, which may involve using some of the already labeled emails (e.g., a random a subset of previously analyzed e-mails) or, although not as efficient, all of the e-mails, to evaluate whether the model is outputting labels correctly. This process facilitates further training of the local model (e.g., a copy of the model used by a single organization) and further parameter updates or adjustments may be provided as feedback. Since each organization works on its own local copy and feeds the local copy of the model a training set, the modelling device receives copies of the global model that have been trained by different sets of emails, which may enable the global model to identify malicious e-mails that are new to one organization but that have been seen by other organizations and are reflected in the feedback that those organizations provided to the modelling device and were aggregated into a current instance of the global model.

The feedback 148 may be received by the modelling device 110 and provided to the modelling engine 120, where it may be used to generate a new or updated model. For example, the feedback 148 may be used to calculate an updated set of parameters for the new model that may more accurately identify malicious e-mails or that may provide a more robust way of identifying malicious e-mails, such as providing capabilities to identify e-mails as malicious for a first group of users or a first organization, but not a second group of users or a second organization. Exemplary aspects of calculating updated parameters based on feedback received from training models in accordance with aspects of the present disclosure are described in more detail below with reference to FIGS. 2 and 3. It is noted that FIG. 1 shows a single organization 102 for purposes of illustration, rather than by way of limitation, and that aspects of the present disclosure may be readily applied to identification and training of models across a plurality of organizations and entities (e.g., businesses, individuals, etc.) to enable federated learning and training of models in order to improve identification of malicious e-mails.

Figure 2:
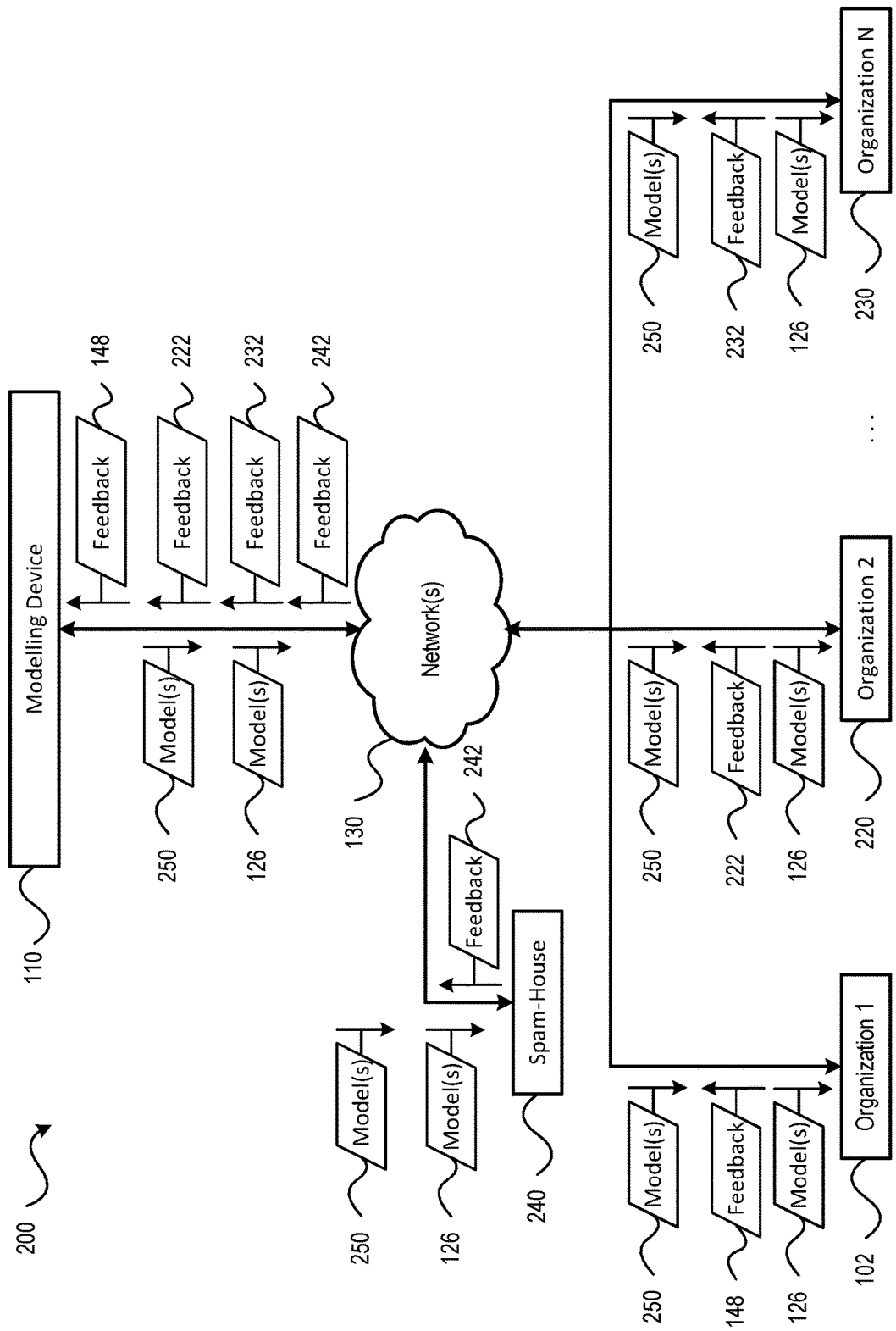
FIG. 2 is a block diagram illustrating aspects of performing federated training of a model for identifying malicious e-mails in accordance with embodiments of the present disclosure.

For example, and referring to FIG. 2, a block diagram illustrating aspects of performing federated training of a model for identifying malicious e-mails in accordance with embodiments of the present disclosure is shown as a system 200. It is noted that FIGS. 1 and 2 use like reference numbers to represent the same or similar components except where otherwise noted. Further, it is noted that the concepts described and illustrated with respect to the system 200 of FIG. 2 may be implemented and utilized by the system 100 of FIG. 1 and vice versa.

As shown in FIG. 2, the system 200 includes the modelling device 110 in communication with the organization 102 via the network 130. Additionally, the modelling device 110 of the system 200 is in network communication with an organization 220 and an organization 230 via the network(s) 130. Although not illustrated in FIG. 2 to simplify the drawing, the organizations 220, 230 may include firewalls, e-mail gateways, exchange servers, and security appliances similar to those described above with reference to FIG. 1.

Additionally, FIG. 2 illustrates a spam house 240, which may be an entity that provides services for identifying malicious e-mails. For example, the spam house 240 may be a threat intelligence organization that collects malicious e-mails from different organizations and distributes information regarding the received malicious e-mails to third parties to aid those third parties in identifying malicious e-mails. One drawback of utilizing spam house-type entities for malicious e-mail identification is the requirement that copies of malicious e-mails are provided to the spam house 240, thereby requiring disclosure of actual e-mail content to the spam house 240. In contrast, utilization of the models distributed by the modelling device 110 do not require organizations to share e-mails with the modelling device 110. Instead, the organizations provide parameter values to the modelling device 110 following convergence of the model parameters during a particular period of training.

As described above with reference to the system 100 of FIG. 1, the modelling device 110 may generate a model 126 and distribute the model 126 to each of the organizations 102, 220, 230. In an aspect, the model 126 may also be distributed to the spam house 240. Once provided to the organizations 102, 220, 230 (and potentially the spam house 240), instances of the model 126 at each of the different entities may be separately trained using received e-mails. As described above, during a training period the parameters of the model 126 may converge to some value and may be provided to the modelling device 110 as feedback. For example, the organization 102 may provide feedback 148, as described above with reference to FIG. 1, the organization 220 may provide feedback 222, the organization 230 may provide feedback 232, and when provided with the model 126, the spam house 240 may provide feedback 242. It is noted that the feedback provided by each of the organizations 102, 220, 230 (and the spam house 240) may be locally trained based on e-mails received by each respective organization individually. For example, the feedback 148 may be generated based on training of the model 126 using e-mails received by the organization 102 during the training period, the feedback 222 may be generated based on training of the model 126 using e-mails received by the organization 220 during the training period, the feedback 232 may be generated based on training of the model 126 using e-mails received by the organization 230 during the training period, and the feedback 242 (when provided) may be generated based on training of the model 126 using e-mails received by the spam house 240 from one or more of the organizations 102, 220, 230 during the training period. Thus, the system 200 facilitates training of the model 126 in a federated manner without requiring e-mails to be shared outside of an organization. It is noted that although the spam house 240 may train the model 126 using e-mails shared by one or more of the organizations 102, 220, 230, such training is facilitated in an isolated manner and the entities participating with the spam house 240 may share e-mails with the spam house regardless of whether the spam house 240 receives the model 126. To illustrate, in some embodiments e-mails may be shared with the spam house 240 and the spam house 240 may use the e-mails to aid in identification of malicious e-mails by subscribers to the spam house—however, such providing of e-mails to the spam house 240 is done to facilitate operations of the spam house and its services, not done for purposes of training the model 126.

As the feedback 148, 222, 232, 242 is received by the modelling device 110 it may be used to create a new set of model parameters for the model(s) 126. For example, as briefly described above, the models generated by the modelling device 110 may be configured to include a set of parameters that may converge to particular values over a training period. The values to which the model parameters converge may be different for each of the organizations 102, 220, 230 and the spam house 240 during a particular training period. The feedback 148, 222, 232, 242 received for that training period may contain the different converged values for the model parameters and the different converged values may be used to calculate new parameter values for the model. To illustrate, suppose the model has 3 parameter values that are initially configured to 1.0 each. During a training period these 3 parameter values may converge to the values indicated in the table below:

TABLE 1

| Entity | Parameter 1 | Parameter 2 | Parameter 3 |
| --- | --- | --- | --- |
| Organization 102 | 1.2 | 0.9 | 1.9 |
| Organization 220 | 1.3 | 1.1 | 1.7 |
| Organization 230 | 1.5 | 0.5 | 1.8 |
| Spam House 240 | 1.1 | 0.9 | 1.1 |

The values indicated in Table 1 may be provided to the modelling device 110 as feedback and the modelling device 110 (e.g., the modelling engine 120) may compile aggregate parameter values based on the feedback. In an aspect, aggregation of the parameter values may include averaging the feedback received from each entity. For example, using the values of Table 1, the aggregated parameter values may be: Parameter 1=1.275 (e.g., 1.275=(1.2+1.3+1.5+1.1)/4); Parameter 2=0.85 (e.g., 0.85=(0.9+1.1+0.5+0.9)/4); and Parameter 3=1.625 (e.g., 1.625=(1.9+1.7+1.8+1.1)/4). It is noted that in this example each of the parameter values received via the feedback may be weighted equally; however, such an example is provided for purposes of illustration, rather than by way of limitation and various techniques may be employed by the modelling device 110 to weight feedback received from different entities differently, as described in more detail below.

In an aspect, the parameter values indicated in the feedback may be weighted based on characteristics of the entities providing the feedback. The characteristic may be associated with a size of the entities, a volume of e-mails the entities receive, information regarding the accuracy of malicious e-mail identification techniques used by the entities, or other types of characteristics. As an example of weighting the feedback parameter values based on a size of the entities, large entities may be more prone to receiving malicious e-mails as compared to similar smaller-sized entities due to the increased likelihood that the larger entities may have more data of interest, such as a database of subscriber information (e.g., credit card numbers, subscriber addresses (physical addresses and/or electronic addresses), financial account information (e.g., a financial institution may maintain information regarding customer bank accounts, financial card numbers, and the like), or other types of information that may be of interest to a party sending malicious e-mails. In such a scenario, the weighting of the feedback parameter values may give more weight to feedback received from larger entities as the parameter values derived via training of the model 126 by the larger entity may be associated with a larger quantity of training data (e.g., a larger e-mail sample size). On the other hand, weighting the feedback parameters values based on the size of an entity may also be configured to attribute more weight to feedback parameters received from smaller entities because they may be targeted more frequently by parties sending malicious e-mails. One factor that may contribute to this type of situation may be the level of sophistication that larger entities have to combat malicious e-mails as compared to smaller entities. For example, larger entities may have more resources to train employees about malicious e-mails, which may reduce the likelihood that those employees interact with malicious e-mails, while smaller entities may not have as many resources to train employees about malicious e-mails, which may increase the likelihood that those employees interact with malicious e-mails. Of course there may be numerous variances to the non-limiting examples described above regarding how the size of an entity may impact occurrences of malicious e-mails.

As another non-limiting example of weighting feedback based on entity characteristics, feedback received from entities that have strong malicious e-mail protections in place may be given more weight than feedback received from entities that have weaker malicious e-mail protections in place. To illustrate, one entity may have IT personnel that are dedicated, at least partially, to reviewing suspected malicious e-mails to confirm whether those e-mails are in fact malicious. Such an entity may more accurately identify malicious e-mails than entities that do not have such measure in place. Thus, the feedback received from the entity with internal confirmation processes for verifying malicious e-mails may be given more weight than feedback received from entities that do not have such confirmation processes because the internal confirmation processes may result in more e-mails being correctly identified or labeled as malicious and thus, provide a stronger understanding of the features of malicious e-mails, than feedback received from other entities. Stated another way, the feedback parameter values received from entities having confirmation processes in place may produce feedback parameter values that include fewer false positives and false negatives, leading to a more accurate feedback parameter set, which may be given more weight during aggregation of feedback parameter values. It is noted that the exemplary techniques for weighting feedback parameter values described above have been provided for purposes of illustration, rather than by way of limitation and that other characteristics and techniques may be used to weight feedback parameter values.

In an aspect, feedback parameters obtained from the spam house may not be given any weight or may be given a reduced weight. This may be done because all e-mails sent to the spam house 240 may be malicious e-mails and those e-mails should also be reflected in the feedback received from the other organizations that are in network communication with the modelling device 110. For example, the organization 102 may detect a malicious e-mail and may forward the malicious e-mail to the spam house 240. The malicious e-mail may be reflected in the parameter values provided in the feedback 148 provided to the modelling device and may also be reflected in the parameters provided in the feedback 242 provided to the modelling device 110 by the spam house 240. Giving the feedback 242 weight (or a higher weight) may skew the analysis of the model 126 because the e-mails may be counted multiple times (e.g., once when received by the organization 102 and again when received at the spam house 240). Limiting the amount of weight attributed to parameters received from the spam house 240 may mitigate such effects and improve the overall characterization of malicious e-mails by the models generated and distributed by the modelling device 110. However, it is noted that the weight, if any, applied to the parameters received from the spam house 240 may vary depending on the particular implementation of the system. For example, if each organization that is already in contact with the spam house 240 is supposed to send a copy of any spam or malicious email regardless of how the e-mail is labeled (e.g., via a local copy of the global model or some other technique) but only a subset of emails (normal and spam) are used to train the local copy of the global model, there is a chance that some e-mails are not randomly selected to be reviewed and used in local training. This means there is a chance that the updating/aggregating process performed by the modelling device considers the emails reported to spam house 240 only once. Thus, another solution to avoid the possibility of biasing the model due to e-mails being considered by both the spam house 240 and one of the organizations is to make sure if an email is reported to spam house 240 it is not included in the e-mail set used for local training/updating of the global model, or if an email is used in the e-mail set for the local training/updating of the global model, then the organization may inform the spam house 240 so that e-mail may be excluded from training e-mail set used for training/updating the spam house's local copy of the global model. After compiling the aggregate feedback parameters, the modelling engine 120 of the modelling device 110 may be configured to generate a new model 250 that is parameterized with parameter values derived from the compiled feedback parameters. To illustrate, in the example above the initial raw model (e.g., the model 126) was initially configured with parameter values set to 1.0, but after compiling the aggregate parameter values based on the feedback 148, 222, 232, 242, the new model 250 may be configured with the parameter values derived from the feedback (e.g., the parameter values 1.275, 0.85, and 1.625 described above with reference to Table 1). As shown in FIG. 2, the model 250 may be distributed by the modelling device 110 to the organizations 102, 220, 230 and the spam house 240, where the new model 250 may be used for future identification and labelling of malicious e-mails (e.g., instead of the model 126). It is noted that the model 250 may also be trained and additional feedback may be transmitted to the modelling device 110, where the feedback may be used to further refine the parameters during generation of another model that may be distributed to by the modelling device 110.

As shown above, embodiments of the present disclosure may enable training of models configured to identify and label malicious e-mails in a coordinated and distributed manner. Moreover, the training of the models enables improvements to model parameters to be made and the new model parameters may be used to generate new models that may be distributed to participating organizations and entities to improve identification and labelling of malicious e-mails. Additionally, all of the operations of the system 200 may be performed without requiring sharing of e-mails between the different organizations or between any of the organizations and the modelling device 110, thereby maintaining the confidentiality of e-mails.

Figure 3:
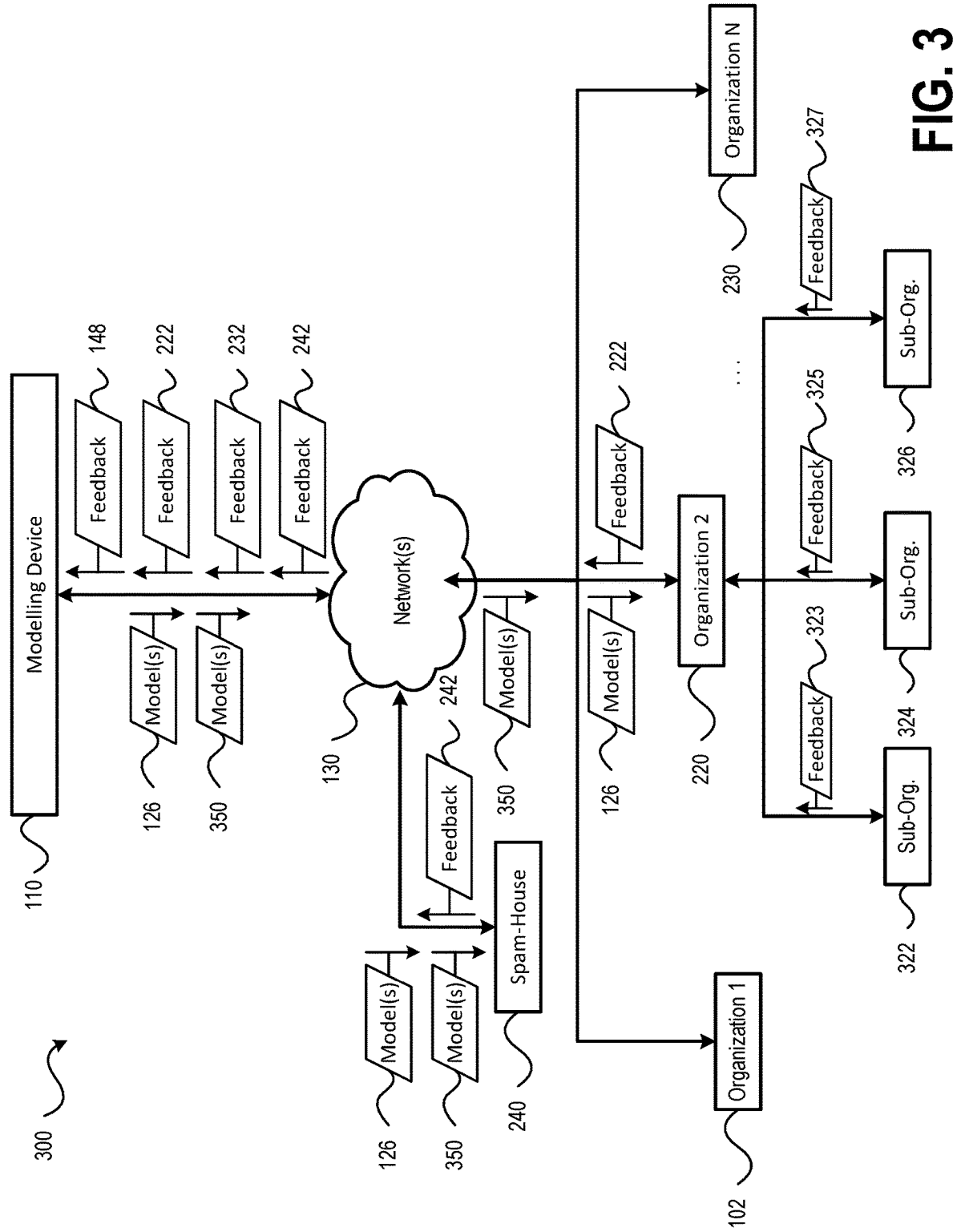
FIG. 3 is a block diagram illustrating additional aspects of performing federated training of a model for identifying malicious e-mails in accordance with embodiments of the present disclosure.

Referring to FIG. 3, a block diagram illustrating additional aspects of performing federated training of a model for identifying malicious e-mails in accordance with embodiments of the present disclosure is shown as a system 300. It is noted that FIGS. 1-3 use like reference numbers to represent the same or similar components except where otherwise noted. Further, it is noted that the concepts described and illustrated with respect to the system 300 of FIG. 3 may be implemented and utilized by the system 100 of FIG. 1 and the system 200 of FIG. 2.

As shown in FIG. 3, the system 300 includes the modelling device 110 in communication with the organization 102, the organization 220, the organization 230, and the spam house 240 via the network 130. As explained above with reference to FIG. 2, the organizations 102, 220, 230 may include firewalls, e-mail gateways, exchange servers, and security appliances similar to those described above with reference to FIG. 1 and are not shown in FIG. 3 to simplify the drawing.

While previous examples (e.g., the exemplary operations of the systems 100 and 200) have illustrated a centralized learning, where a single instance of the model 126 is trained at each organization, the embodiment illustrated in FIG. 3 demonstrates aspects of performing coordinated learning using models generated in accordance with the present disclosure. For example and as illustrated in FIG. 3, the organization 220 may be a large organization that may have many sub-organizations, such as sub organizations 322, 324, 326. The sub-organizations may be different groups within the organization 220, which may be collocated at a single location or may be geographically distributed across different geographic locations (e.g., different cities, states, countries, etc. The different sub-organizations 322, 324, 326 may receive different types of malicious e-mails, which may be caused by different malicious e-mail campaigns targeting different groups within the organization. To facilitate more robust training of the model 126, the e-mails directed to each sub-organization may be used to train the model 126. For example, e-mails directed to each of the different sub-organizations 322, 324, 326 may be used to train the model 126, thereby coordinating the training of the model 126 based on the e-mails each sub-organization receives. This may enable more robust malicious e-mail detection and allow nuanced differences between how targeted malicious e-mail campaigns are used to attach the organization 220 (e.g., because different sub-organizations may be targeted with different malicious e-mail campaigns). The coordinated learning approach may also enable a more nuanced approach to labelling malicious e-mails to be realized because e-mails directed to one sub-organization may not be malicious, but may appear malicious if sent to other sub-organizations within the organization 220.

As described above, the training of the model 126 may result in a set of converged parameters that may be provided as feedback 222 to the modelling device. As described above, the feedback 222 may be weighted equally with the feedback 102, 232, 242 received from the other participants to the system 300, as illustrated in Table 1 above, or may be weighted differently due to one or more characteristics of the organization 220, such as the size of the organization or other characteristics.

In an aspect, different instances of the same model 126 may be trained using e-mails received by each of the different sub-organizations 322, 324, 326 and the feedback 222 may be derived from the parameters of each different instance of the model 126 during training. For example, training of an instance of the model 126 based on the e-mails received by the sub-organization 322 may result in feedback 323, training of an instance of the model 126 based on the e-mails received by the sub-organization 324 may result in feedback 325, and training of an instance of the model 126 based on the e-mails received by the sub-organization 326 may result in feedback 327. The feedback 222 may include the parameters of the feedback 323, 325, 327. In an aspect, the parameters included in the feedback 323, 325, 327 may be aggregated prior to transmitting the feedback 222 to the modelling device. Furthermore, the aggregation of the feedback 323, 325, 327 may involve weighting the parameters derived from the training, as described above.

It is noted that the various embodiments illustrated and described with reference to FIGS. 1-3 may be utilized across many different organizations, each of which may have the same mail server or different mail servers and mail service providers. Moreover, it is noted that embodiments are not limited to a particular type or number of firewalls, mail gateways, security appliances, exchange servers, and the like, and that different organizations used to train models in accordance with aspects of the present disclosure may utilize different number and types of these components. Also, it is to be understood that during a given training period each participating entity or organization may be using the same model or instance(s) of the model, which may be replaced with an updated or new model following the end of the current training period. The particular length or duration of a training period may fluctuate over time. For example, while a typical training period may have a duration of 1 week in order to provide a large sample size of e-mails to be used to train the model, the duration may be adjusted periodically. One factor that may contribute to changes in the training period is the scale of malicious e-mail campaigns. For example, if a new malicious e-mail campaign is identified the duration of the training period may be shortened to enable an updated model to be distributed with parameters that may be used to identify and label e-mails belonging to the newly discovered malicious e-mail campaign.

In an aspect, security appliances used to train the models may be configured to detect triggering events that may alter the duration of the training period, such as the detection of a new malicious e-mail campaign, discovery of a new feature that strongly suggests an e-mail is malicious (e.g., a new botnet), or some other event. It is noted that when a single security appliance detects an event that triggers a shortened training period, the security appliance may transmit feedback to the modelling device 110 and the feedback may include a flag that indicates the duration of the training period was shortened due to the detection of a triggering event. When the modelling device 110 receives feedback that includes a flag having a value that indicates a triggering event has been detected, the modelling device 110 may transmit a notification to other participating entities to signify that a current training period is over and request that those entities provide their feedback for the current training period. By using triggering events to control transmission of feedback and to adjust the duration of training periods dynamically, new models containing parameters configured to detect emerging malicious e-mail threats may be rapidly deployed, which may mitigate the impact that those malicious e-mail campaigns have on the participating organizations.

It is noted that although FIGS. 1-3 illustrate the modelling device 110 as being a standalone device, embodiments of the present disclosure may utilize multiple modelling devices 110. Additionally, the functionality provided by the modelling device 110 may be deployed in a cloud configuration, rather than via a server or other type of physical device. In such an arrangement, the functionality provided by the modelling device 110 may be provided via computing resources disposed on a network (e.g., in the cloud). Utilizing a cloud-type configuration may enable systems operating in accordance with the present disclosure to scale more efficiently and in a cost effective manner. For example, where the modelling device 110 is provided via a server, additional capacity may require an additional server capable of performing the functions of the modelling device to be held on standby. When not in use, this additional server may sit idle, resulting in inefficient use of the computing resources of the server and increasing the overhead of the system. In contrast, where the modelling device is deployed in the cloud, computing resources may be allocated to the functions of the modelling device as additional computational power is needed and the deallocated (or reallocated) to other systems or functionalities when not in use (e.g., cloud service providers often charge based on the use of computing resources so unused computational resources may not result in increased overhead to the operator of the modelling device and may not sit idle when not used to provide functionality of the modelling device). It is noted that regardless of its physical deployment structure (e.g., deployment on one or more servers of a cloud-based configuration), the modelling device 110 may be operated as a trusted coordinator or aggregator, such as an entity or service provider that is trusted to oversee creation, updating, and distribution of the models by the organizations that utilize the models to identify malicious e-mails.

Figure 5:
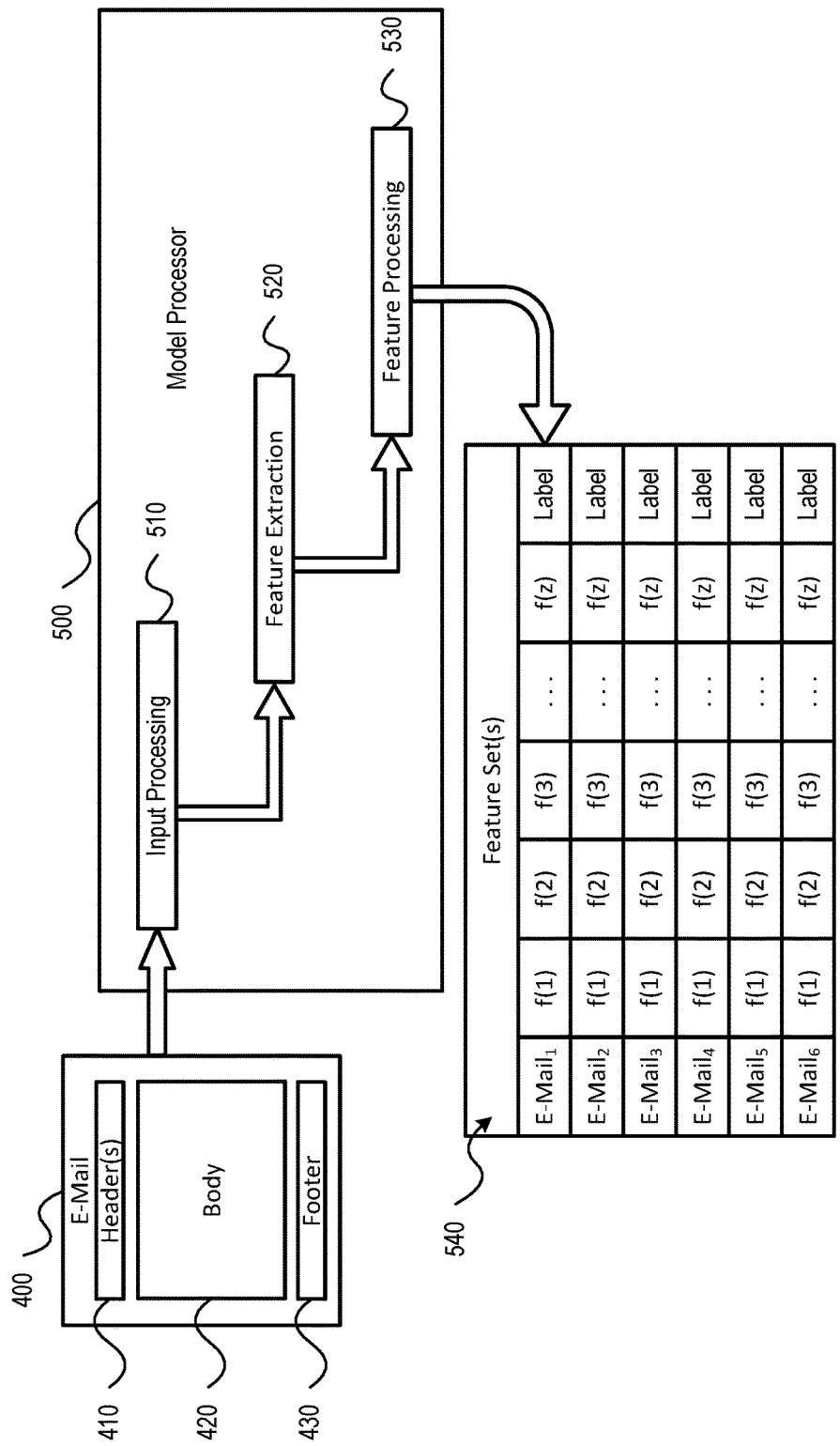
FIG. 5 is a block diagram illustrating exemplary aspects of analyzing e-mails in accordance with embodiments of the present disclosure.

Referring to FIG. 5, a block diagram illustrating exemplary aspects of analyzing e-mails in accordance with embodiments of the present disclosure is shown. It is noted that the concepts described and illustrated in FIG. 5 may be utilized to train models for use in improving systems for identifying and labelling e-mails as malicious or safe. It is noted that the process for training a model shown in FIG. 5 may be performed by all organization, which may include department or other sub-units of an organization) that have a local copy of the global model, and that the training process may be used to update the local model and parameters based on local e-mail samples before sending the updated parameters as feedback to a modelling device operated by an aggregator/coordinator. Additionally, it is noted that while the description of FIG. 5 describes training a model using a single e-mail, embodiments may utilize a training e-mail set that includes a plurality of e-mails. Using multiple e-mails may enable machine learning-based training (whether supervised or unsupervised) of the local copies of the model to find patterns in multiple e-mail samples and larger training sets may yield more accurate modifications to the model parameters. Thus, it should be understood that the training process illustrated in FIG. 5 may be performed using multiple e-mails as part of a training set for updating model parameters according to embodiments.

As shown in FIG. 5, an e-mail, such as the e-mail 400 of FIGS. 4A-4C, may be selected for processing by a model processor 500. In an aspect, the model processor 500 may be provided by a security appliance (e.g., the security appliance 146 of FIG. 1). As described above, the e-mail 400 may include a header portion 410, a body portion 420, and a footer portion 430. Information contained in these different portions of the e-mail may indicate that an e-mail is malicious and the model may be configured to record features from the e-mail 400 (and other emails). For example and as shown in FIG. 5, the e-mail 400 may be provided to model processor 500 as an input. Various processing and analysis operations may be performed on the e-mail by the model processor to generate a model 540.

As shown in FIG. 5, the model 540 may include a plurality of rows and columns. The different rows of the model 540 may correspond to different e-mails (e.g., row 1 corresponds to e-mail$_1$, row 2 corresponds to e-mail$_2$, row 1 corresponds to e-mail$_3$, and so on) and columns may correspond to features identified in the corresponding e-mail. It is noted that although FIG. 5 illustrates the first column as including information identifying the e-mails corresponding to each row, such information does not need to be included in the model 540—indeed, one of the advantages of the techniques disclosed herein is that e-mails do not need to be shared with entities outside of an organization and thus, the model 540 may not include a copy of the e-mail 400. Instead of storing a copy of the e-mail 400, the model 540 may be configured to record a feature set that may be used to identify e-mails as malicious or safe. In the example shown in FIG. 5, the feature set is shown as including z features: f(1), f(2), f(3), . . . , f(z), where z>1. It is noted that the particular number of features included in the feature set of the model may change over time such that during one period of time the feature set may include z features and in a different period of time the feature set may include x features, where x>z or x<z. Changes to the number of features included in the feature set may occur due to changes in malicious e-mail threats, such as to include additional features in the feature set for new or emerging malicious e-mail campaigns, or to reduce the features of the feature set (e.g., if one of the features tracked by the model 540 turns out to be a poor indicator of malicious e-mails, is found to be redundant of another feature, or for other reasons). Each of the different features may be obtained via the processing and analysis performed by the model processor 500, as described in more detail below.

To extract the relevant features of the model 540, at least a portion of the e-mail may be processed by input processing logic 510 of the model processor 500. The input processing logic 510 may be configured to condition at least the portion of the e-mail for analysis by feature extraction logic 520. In an aspect, the input processing logic 510 may perform natural language processing (NLP) on text data included in the e-mail 400, such as the body portion 420. Performing NLP on the text data of the e-mail 400 may include lemmatization and stemming (e.g., removing suffixes from words, such as to remove "ing", "ed", or other suffixes from words present in the input data 202, and the like), sentence segmentation (e.g., dividing the e-mail 400 into component sentences), and the like. Based on the NLP processing, the body portion 420 of the e-mail 400 may be transformed into a list of words in a standardized format that may be analyzed by the feature extraction logic 520.

The feature extract logic 520 may be configured to extract features of interest for the model 540. One or more of the features of the model 540 may be derived directly from the e-mail 400 without requiring processing by the input processing logic 510, while other features may be dependent on the outputs of the input processing logic 510. As an illustrative example, one or more features may be derived from the header portion 410 of the e-mail 400. As briefly described above, the header portion 410 may include information that indicates one or more nodes that have participated in delivery of the e-mail 400, as well as information regarding the sender of the e-mail 400, the intended recipient(s) of the e-mail 400, a mail server from which the e-mail 400 originated, one or more e-mail gateways involved in the process of delivering the e-mail 400 (e.g., including both sending the e-mail 400 from the originating mail server and receiving the e-mail at one or more destination mail gateways), or other types of information. As part of the feature extraction process performed by the feature extraction logic 520, the information included in the header portion 410 and the footer portion 430 may be identified. In an aspect, each header included in the header portion 410 and each footer included in the footer portion 430 may be identified by the feature extraction logic as candidate features. The candidate features may be provided to the feature processing logic 530.

The feature processing logic 530 may be configured to process the candidate features and populate the information in the model 540. For example, suppose that feature f(1) corresponds to whether the header portion of an e-mail includes a header that indicates the e-mail originated from a mail server known to send malicious e-mails. If the candidate features derived from the header portion 410 include information indicating the e-mail 400 originated from a malicious mail server, the feature f(1) for the e-mail 400 may be configured by the feature processing logic 530 to have a first value, and if the candidate features derived from the header portion 410 include information indicating the e-mail 400 did not originate from a malicious mail server, the feature f(1) for the e-mail 400 may be configured by the feature processing logic 530 to have a second value. In an aspect, the first and second values may be binary values, such as using a "1" to indicate the e-mail originated from a malicious mail server and using a "0" to indicate the e-mail did not originate from a malicious mail server. It is noted that other possible values may be used, such as using "T" and "F" for indicating the e-mail did or did not originate from a malicious mail server, respectively. Additional verifications may be performed by the feature processing logic 530 for other candidate features derived from the header portion 410 and the footer portion 430 and features of the model 540 may be updated to indicate values for those features.

In addition to deriving candidate features from the header and footer portions of the e-mail 400, the feature extraction logic 520 may be configured to extract features from the body portion 420. As described above, the input processing logic 510 may be configured to generate conditioned data using NLP techniques and/or other processes that may remove noise from the text of the body portion 420 of the e-mail 400. Following the processing of the input processing logic 510, the conditioned data may be provided to the feature extraction logic 520 for analysis. The feature extraction logic 520 may be configured to analyze the conditioned data to generate one or more candidate features based on the body portion 420. Candidate features derived from the body portion 420 may include keywords, links, file extensions associated with any attachments to the e-mail 400, or other types of data. The candidate features derived from the body portion 420 may be provided to the feature processing logic 530 where the candidate features may be analyzed and used to update values within the model 540. For example, the feature processing logic 530 may analyze the candidate features derived from the body portion 420 to determine whether any keywords associated with malicious e-mails are present. If a keyword or keywords are determined to be present, the feature processing logic 530 may update a corresponding feature value of the model 540, such as the feature f(2), to a first value that indicates a keyword(s) is present that suggests the e-mail may be malicious or to a second value that indicates the keyword(s) is not present. Additionally, the feature processing logic 530 may analyze the candidate features derived from the body portion 420 to determine whether targets of any links included in the body portion 420 are related to malicious websites (e.g., botnets, etc.) or to determine whether file extensions associated with any attachments to the e-mail 400 are potentially malicious (e.g., ".exe" file extensions, etc.) and may update corresponding features of the model 540 based on the analysis.

In addition to the processing described above, the model 540 may include a feature associated with a label applied to the e-mail 400. In an aspect, the label may be applied to the e-mail 400 by the security appliance 146 of FIG. 1 (or similar components of the systems illustrated in FIGS. 2 and 3). For example, the organization receiving the e-mail 400 may execute a set of e-mail processing rules against the e-mail 400 to determine whether the organization deems the e-mail as malicious or safe. After such determination has been made, the e-mail may be associated with a label (e.g., "safe" or "malicious") and that label may be recorded to the model 540. In an additional or alternative aspect, the label included in the model 540 may be determined by the feature processing logic 530 based on the features associated with the e-mail(s). As can be appreciated from the description above, training the model 540 using the model processor 500 may enable a rich feature set of malicious e-mails to be obtained. It is noted that during the training of the model 540, the feature set that is generated may include not only information about malicious e-mails, but may also include information regarding features of safe e-mails. Developing feature sets characteristic of safe e-mails is something that previous malicious e-mail detection systems did not do (e.g., because such systems were designed with the narrow goal of identifying malicious e-mails) but may provide insights that could help distinguish close calls on whether an e-mail is malicious or safe. It is noted that because the values used to populate the feature set(s) of the model 540 do not include the private information or contents of the e-mail, the need to share e-mail content with third parties is obviated while still enabling information derived from the e-mails to be used to improve malicious and safe e-mail identification processes.

While the description above has been described using an example of an unsupervised training of the model, in an aspect the model may be trained using supervised machine learning algorithms. In such an implementation, users (e.g., security administrators) may manually review and label at least some of the e-mails included in the training set and the manually reviewed e-mail samples may be used to update the parameters of the local copy of the model. However, regardless of whether supervised or unsupervised techniques are utilized to train the local copy of the model, the training set may include a plurality of e-mail samples. Additionally, it is noted that the parameters of the model may be updated or modified based on a portion of the e-mails analyzed or may be updated or modified based on all e-mails.

In an aspect, the feature processing logic 530 may further be configured to score each e-mail based on the values assigned to the features of the model 540. For example, feature f(z) may be a score that is assigned to each e-mail analyzed by the model 540 and may be determined based on the values assigned to one or more of the features of the model 540. Scores exceeding a threshold score may be suspected of being malicious while scores below the threshold score may be suspected of being safe. In some aspects, multiple scores may be calculated, such as scores for multiple individual features or groups of features. As briefly described above with reference to Table 1, the scores may be used to update parameters of the model 540. For example, over time the model 540 may be trained and feature sets for the e-mails used to train the model 540 may be created. As the feature sets are created, one or more scores may be calculated and scores and feature sets may be provided as feedback to a modelling device (e.g., the modelling device 110 of FIGS. 1-3.

The modelling device may analyze the feedback, adjust the threshold scores, and generate an updated or new model that may then be redistributed to participating organizations for use in identifying malicious e-mails. By including the labels assigned to the e-mails with the feature sets, weighting principles may be applied to adjust the threshold scores in a more meaningful way. For example, where feedback from a first organization known to have strong processes for accurately identifying malicious e-mails is received, the scores and feature sets received from the first organization may be weighted more heavily than scores and features received from a second organization known to have weak processes identifying malicious e-mails. Weighting the feedback from the first organization more heavily may result in adjusted parameter values for the model that may accurately reflect when e-mails should be categorized as malicious or safe. For example, if the second entity is given equal weight during adjusting of the parameters, the adjusted parameters may result in an increased number of false positives and/or false negatives due to the fact that the second entity's processes for identifying malicious e-mails may produce such results. By giving more weight to the first organization and less weight to the second organization during the adjustment process, the influence of the inferior processes used by the second organization may be mitigated while still attributing at least some of the parameter adjustments to the training of the model by the second organization.

In an aspect, multiple models may be generated by the modelling device and used to identify malicious e-mails. For example, a first model, which may be referred to as a B model, and a second model, which may be referred to as an X model, may be generated by the modelling device. The B model may be configured to generate a value that indicates a likelihood that the e-mail is malicious based on features derived from the body of the e-mail(s), such as the features described above with respect to body portion 420. The X model may be configured to generate a value that indicates a likelihood that the e-mail is malicious based on features of the header and footer portions of the e-mail(s) and the value generated by the B model. In an aspect, the X model value may be used to apply a final label to the e-mail(s) indicating whether the e-mail is malicious or safe and the B model value may indicate a probability that the e-mail is malicious. It is noted that the probability may be generated differently depending on particular machine learning techniques utilized. To illustrate, a classification model having two outputs/labels (e.g., safe and malicious) may provide binary labelling, which may yield a probability value for each output, such as 0.97 means most likely to be malicious and 0.1 means unlikely to be malicious. The probability values may be calculated based on the model being used and regardless of whether the training is performed in a supervised or unsupervised manner. It is noted that while the dual model approach described above utilizes the value derived from the B model as an input to the X model, such description has been provided for purposes of illustration, rather than by way of limitation and that other arrangements involving multiple models may be used in accordance with aspects of the present disclosure. It is also noted that the probability values of 0.97 and 0.1 have been provided for purposes of illustration, rather than by way of limitation and that other probability values between 0 and 1 may be utilized to indicate the probability that an e-mail or e-mails are malicious or non-malicious depending on the particular configuration of the models and other factors.

The use of models according to embodiments of the present disclosure to identify malicious e-mails may provide additional advantages over previous approaches to malicious e-mail identification. For example, the models described herein may improve the ability to perform horizontal and vertical analysis of malicious e-mails. In horizontal malicious e-mail schemes, the e-mails may have the same features but different characteristics, such as different numbers of headers and footers, different information identified in the headers and footer (e.g., different senders, recipients, mail servers, IP addresses, etc.), but may include the same information in the body portion of the e-mail. In vertical malicious e-mail schemes, the e-mails may include the same header and footer information (e.g., same sender(s), recipients, mail servers, IP addresses, etc.), but may include different information in the body portion. As shown above, the models utilized by embodiments of the present disclosure develop feature sets that may be used to identify e-mails regarding of specific traits of any single e-mail. For example, in the dual B/X model example described above, the B model may enable identification of horizontal malicious e-mail threats by focusing on the body portion of the e-mail, while the X model may enable identification of vertical malicious e-mail threats by focusing on the header and footer information included in the e-mail. Additionally, even though different malicious e-mails may have different features, combinations of features developed during training of the models may enable identification of similarities between different types of malicious e-mails as well as distinguishing features sets representative of safe e-mails. Accordingly, embodiments of the present disclosure provide an improved process for identifying malicious e-mails through application of machine learning concepts to e-mail threat detection systems.

Figure 6:
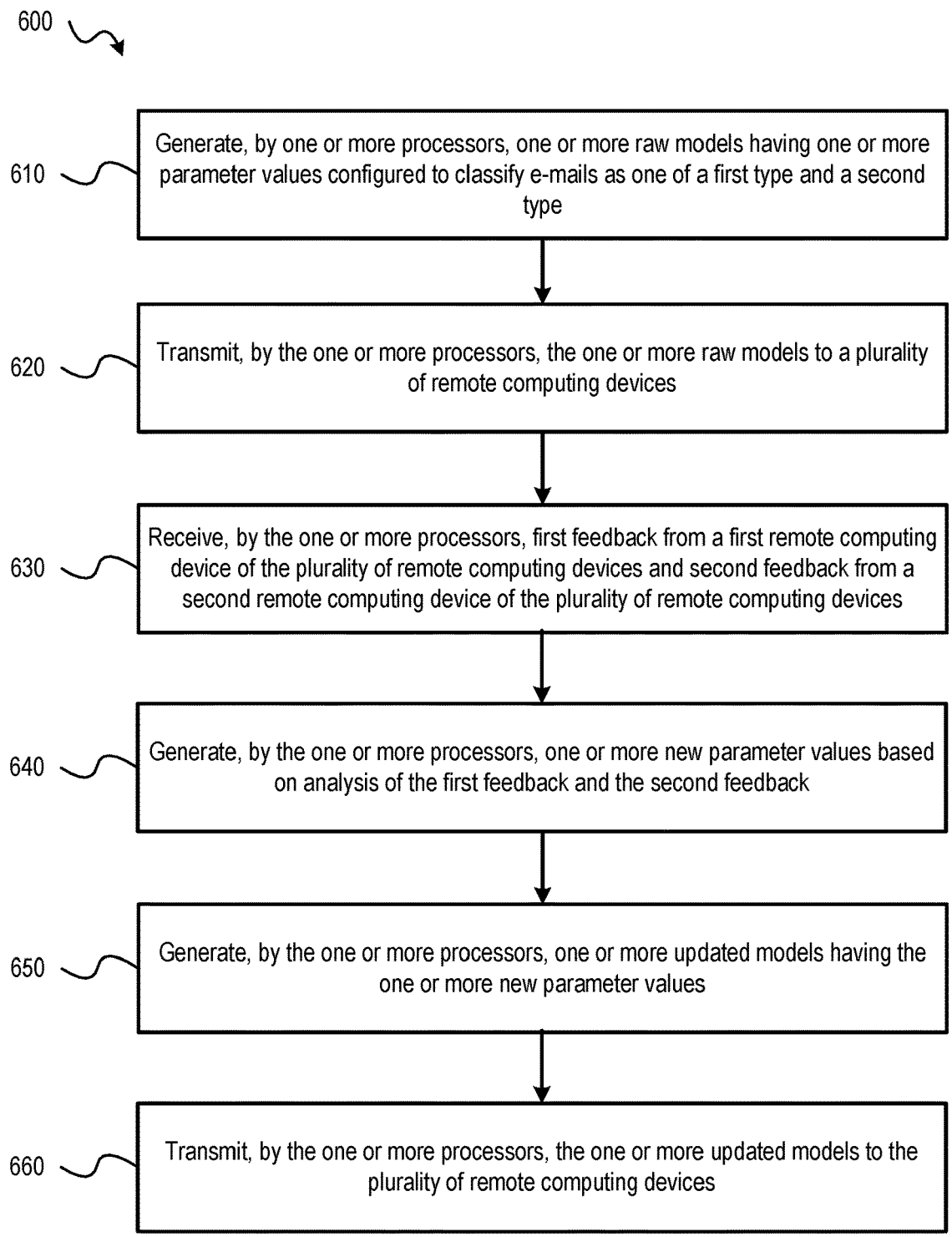
FIG. 6 is a flow diagram of a method for identifying malicious e-mail threats while maintaining privacy of e-mail content in accordance with embodiments of the present disclosure.

Referring to FIG. 6, a flow diagram of a method for identifying malicious e-mail threats while maintaining privacy of e-mail content in accordance with embodiments of the present disclosure is shown. In aspects, the operations of the method 600 may be stored as instructions (e.g., the instructions 116 of FIG. 1) that, when executed by one or more processors (e.g., the one or more processors 112 of FIG. 1), cause the one or more processors to perform the steps of the method 600. In aspects, the method 600 may be performed by a modelling device, such as modelling device 110 of FIG. 1. In an aspect, the modelling device may include a modelling engine (e.g., the modelling engine 120 of FIG. 1) and at least a portion of the steps of the method 600 may be performed by the modelling engine.

As shown in FIG. 6, at step 610, the method 600 includes generating, by one or more processors, one or more raw models having one or more parameter values configured to classify e-mails as one of a first type and a second type. The first type of classification (or label) may correspond to a malicious e-mail and the second type of classification (or label) may correspond to a non-malicious e-mail (e.g., a safe e-mail). In an aspect, the one or more raw models may include a B model and an X model. As described above with reference to FIG. 5, the B model may be configured to analyze features derived from a body portion of e-mails and the X model may be configured to analyze outputs of the B model and features derived from at least one of a header portion and a footer portion of the e-mails. The outputs of the B model may indicate a probability or likelihood that e-mails received by an organization are malicious e-mails, which may be included in as a feature within a feature set of the X model. The analysis associated with the X model may be configured to apply a label or classification to the e-mails, such as to indicate whether e-mails received by an organization are malicious or safe. At step 620, the method 600 includes transmitting, by the one or more processors, the one or more raw models to a plurality of remote computing devices. The plurality of remote computing devices may include computing devices similar the devices described in connection with the organization 102 of FIG. 1, such as mail gateways, exchange servers, security appliances, and the like. Different ones of the plurality of remote computing devices may belong to different entities, as illustrated with respect to the organization 102, the organization 220, the organization 230, and the spam house 240 (e.g., a service provider in the threat intelligence community) with respect to FIGS. 1-3.

At step 630, the method 600 includes receiving, by the one or more processors, first feedback from a first remote computing device of the plurality of remote computing devices and second feedback from a second remote computing device of the plurality of remote computing devices.

In an aspect, the first remote computing device may be associated with a first entity of the different entities, such as the organization 102 of FIGS. 1-3, and the second remote computing device associated with a second entity of the different entities, such as the organization 220 of FIGS. 2-3. The first feedback may be generated via training of the one or more raw models by the first remote computing device based on a first set of e-mails received by the first entity. The second feedback may be generated via training of the one or more raw models by the second remote computing device based on a first set of e-mails received by the second entity. For example, the first feedback may be the feedback 148 of FIGS. 1-3 and the second feedback may be the feedback 222 of FIGS. 2-3.

At step 640, the method 600 includes generating, by the one or more processors, one or more new parameter values based on analysis of the first feedback and the second feedback. In an aspect, generating the one or more new parameter values based on analysis of the trained models may include analyzing the first feedback and the second feedback, and applying weights to the first feedback and the second feedback. The one or more new parameter values may be generated based on the weights applied to the first feedback and the second feedback, as described above with reference to FIGS. 2-3. In an aspect, the plurality of remote computing devices may include a third remote computing device associated with spam house entity or other member of the threat intelligence community and third feedback may be received from the third remote computing device. The third feedback may be analyzed and used to generate the one or more new parameter values. In an aspect, no weight or a reduced weight may be applied to the third feedback (e.g., to mitigate double counting malicious e-mails that may have been indicated in feedback received from the other remote computing devices and given at least some weight during generation of the updated parameter values).

At step 650, the method 600 includes generating, by the one or more processors, one or more updated (or upgraded) global models having the one or more new parameter values. At step 660, the method 600 includes transmitting, by the one or more processors, the one or more updated global models to the plurality of remote computing devices.

In an aspect, the method 600 may include transmitting a training period message to the plurality of remote computing devices. The training period message may identify a period of time during which the one or more raw models (or upgraded model(s)) are to be trained by each of the plurality of remote computing devices, and the first feedback and the second feedback may be received following a conclusion of the period of time identified in the training period message. In an aspect, the method 600 may include receiving a notification from the first remote computing device indicating a triggering event has occurred. The triggering event may indicate that a new or emerging malicious e-mail threat has been identified. When triggering events are utilized, the feedback (e.g., the first feedback or feedback from another of the plurality of remote computing devices) may be received prior to a conclusion of the period of time identified in the training period message. It is noted that the period of time for training the one or more raw models may be dynamically configurable. For example, an operator of the modelling device may utilize a graphical user interface to adjust the duration of a particular training period or the modelling device may be configured to adjust the duration of the training period based on detected malicious e-mails. For example, if an emerging malicious e-mail campaign is detected, the modelling device may shorten the training period duration so as to more quickly collect information regarding current malicious e-mail threats, allowing development of a robust set of features for the emerging malicious e-mail campaign more quickly than if the training period was longer. When triggering events are detected and the modelling device is notified of the occurrence of a triggering event, the modelling device may transmit a feedback request message to one or more of the remote computing device. The feedback request may include a request to provide feedback prior to the conclusion of the period of time identified in the training period message and the remote computing devices may provide feedback prior to the conclusion of the period of time identified in the training period message based upon the feedback request message.

As shown above, the method 600 provides a robust process for identifying malicious e-mails and collecting information regarding emerging malicious e-mail campaigns. As described above with reference to FIGS. 1-5, the method 600 provides the advantage that feedback may be provided to the modelling device without requiring the entities or organization to share e-mails with the modelling device (e.g., the feedback does not include the e-mails used to train the one or more raw models), thereby maintaining the privacy of the e-mails received by each different entity. Additionally, the method 600 enables features sets for malicious e-mails, as well as non-malicious e-mails, to be developed and rapidly shared between different organizations, thereby improving those organizations' ability to respond to malicious e-mail threats.

Figure 7:
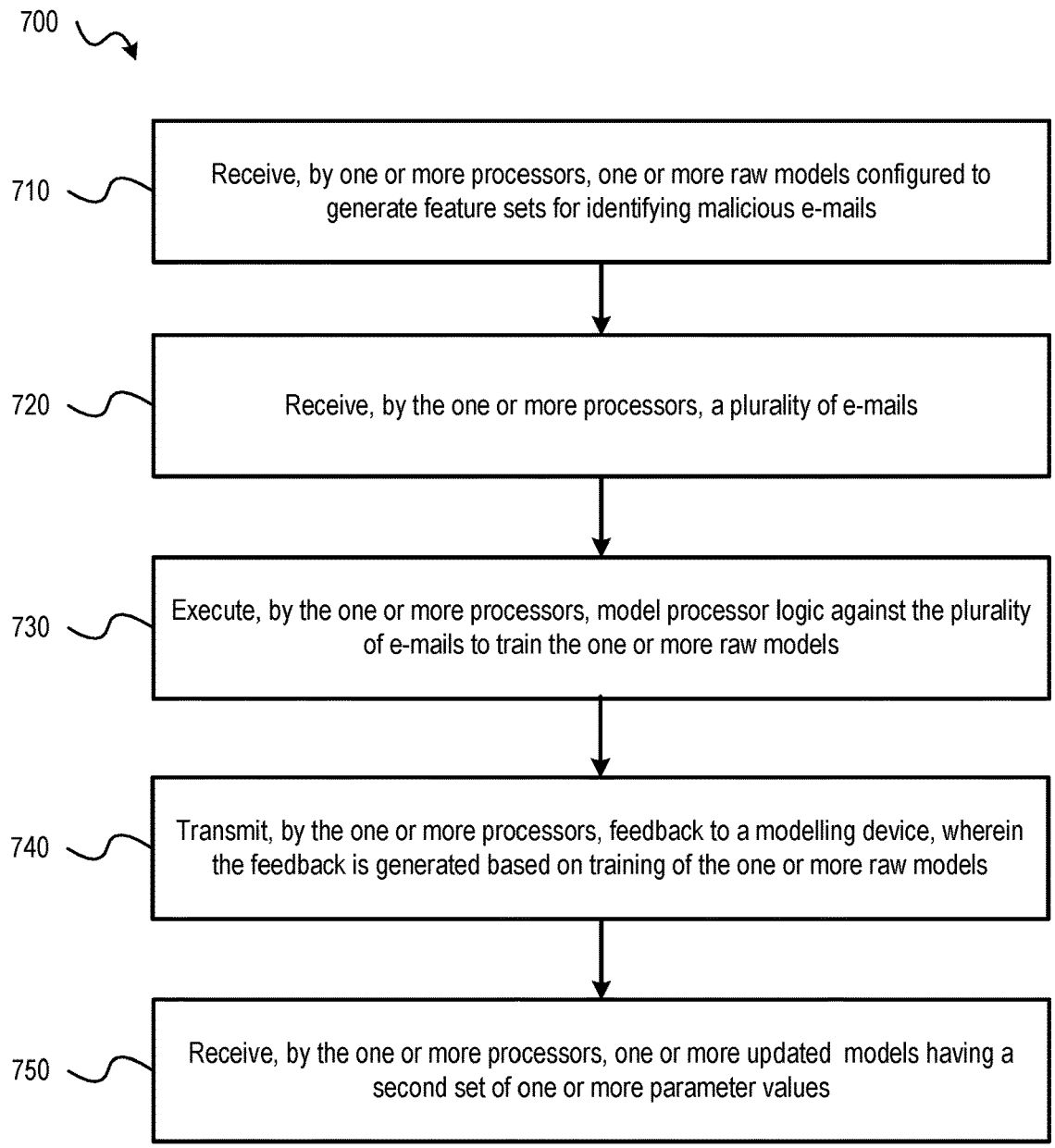
FIG. 7 is a flow diagram of a method for identifying malicious e-mail threats while maintaining privacy of e-mail content in accordance with embodiments of the present disclosure.

Referring to FIG. 7, a flow diagram of a method for identifying malicious e-mail threats while maintaining privacy of e-mail content in accordance with embodiments of the present disclosure is shown. In aspects, the operations of the method 700 may be stored as instructions that, when executed by one or more processors, cause the one or more processors to perform the steps of the method 700. In aspects, the method 700 may be performed by a security appliance or other computing device (e.g., a mail gateway, an exchange server, or another electronic device).

At step 710, the method 700 includes receiving, by one or more processors, one or more raw models configured to generate feature sets for identifying malicious e-mails. In an aspect, the one or more raw models may be configured with a set of one or more parameter values for classifying e-mails as one of a first type or a second type. The first type of classification (or label) may correspond to a malicious e-mail and the second type of classification (or label) may correspond to a non-malicious e-mail (e.g., a safe e-mail). In an aspect, the one or more raw models may include a B model and an X model. As described above with reference to FIG. 5, the B model may be configured to analyze features derived from a body portion of e-mails and the X model may be configured to analyze outputs of the B model and features derived from at least one of a header portion and a footer portion of the e-mails. The outputs of the B model may indicate a probability or likelihood that e-mails received by an organization are malicious e-mails, which may be included as a feature within a feature set of the X model. The analysis associated with the X model may be configured to apply a label or classification to the e-mails, such as to indicate whether e-mails received by an organization are malicious or safe.

The method 700 includes, at step 720, receiving, by the one or more processors, a plurality of e-mails and at step 730, executing, by the one or more processors, model processor logic against the plurality of e-mails to train the one or more raw models. In an aspect, the model processor logic may be the model processor logic 500 of FIG. 5. In an aspect, executing the model processor logic may include: deriving candidate features based on a first e-mail of the plurality of e-mails, evaluating the candidate features to identify features indicative of a malicious e-mail, and applying at least some of the candidate features to the one or more raw models to label the first e-mail as a malicious e-mail or a safe e-mail, as described above with reference to FIG. 5.

At step 740, the method 700 includes transmitting, by the one or more processors, feedback to a modelling device. In an aspect, the modelling device may be the modelling device 110 of FIGS. 1-3. The feedback may be generated based on training of the one or more raw models, as described above with reference to FIGS. 1-3. In an aspect, the method 700 may include receiving a training period message from the modelling device. The training period message may identify a period of time during which the one or more raw models are to be trained, and the feedback may be transmitted to the modelling device following a conclusion of the period of time identified in the training period message. In an aspect, triggering events may be used and the method 700 may include generating a notification from the first remote computing device indicating a triggering event has occurred. When triggering events are used, feedback may be transmitted to the modelling device based on occurrence of a triggering event. At step 750, the method 700 includes receiving, by the one or more processors, one or more updated (or upgraded) global models having a second set of one or more parameter values. The second set of one or more parameter values may include parameter values updated based on the feedback. The second set of one or more parameter values may also be updated based on other feedback generated by one or more third parties.

As shown above, the method 700 provides a robust process for identifying malicious e-mails and collecting information regarding emerging malicious e-mail campaigns. As described above with reference to FIGS. 1-5, the method 700 provides the advantage that feedback may be provided to the modelling device without requiring the entities or organization to share e-mails with the modelling device (e.g., the feedback does not include the e-mails used to train the one or more raw models), thereby maintaining the privacy of the e-mails received by each different entity. It is noted that although organizations may transmit e-mails to a threat intelligence service provider, such as the spam house 240 of FIGS. 2-4, the operations of the threat intelligence services provider are external to operations of embodiments and e-mails need not be shared with the modelling device or between different organizations to identify malicious e-mails according to the concepts disclosed herein. Additionally, the method 700 enables features sets for malicious e-mails, as well as non-malicious e-mails, to be developed and rapidly shared between different organizations, thereby improving those organizations' ability to respond to malicious e-mail threats. It is noted that, in the embodiments described and illustrated with reference to FIGS. 1-7, the term "raw" model(s) may be used to refer to the first time that the model(s) is distributed to the organizations and all subsequent models that are derived from feedback may be referred to as "updated" or "upgraded" models. Additionally, the term "global model" may be used to reflect all participating organizations receive a copy of the initial or raw model (e.g., the model(s) received by each organization have the same set of parameters).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 1-7) may comprise processors, electronics devices, hardware devices, electronics components, logical circuits, memories, software codes, firmware codes, etc., or any combination thereof. In addition, features discussed herein relating to FIGS. 1-7 may be implemented via specialized processor circuitry, via executable instructions, and/or combinations thereof.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. Additionally, the phrase "A, B, C, or a combination thereof" or "A, B, C, or any combination thereof" includes: A alone, B alone, C alone, a combination of A and B, a combination of A and C, a combination of B and C, or a combination of A, B, and C.

The terms "comprise" and any form thereof such as "comprises" and "comprising," "have" and any form thereof such as "has" and "having," and "include" and any form thereof such as "includes" and "including" are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any implementation of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, it will be understood that the term "wherein" may be used interchangeably with "where."

Further, a device or system that is configured in a certain way is configured in at least that way, but it can also be configured in other ways than those specifically described. Aspects of one example may be applied to other examples, even though not described or illustrated, unless expressly prohibited by this disclosure or the nature of a particular example.

Those of skill would further appreciate that the various illustrative logical blocks, modules, circuits, and algorithm steps (e.g., the logical blocks in FIGS. 6-7) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

The above specification and examples provide a complete description of the structure and use of illustrative implementations. Although certain examples have been described above with a certain degree of particularity, or with reference to one or more individual examples, those skilled in the art could make numerous alterations to the disclosed implementations without departing from the scope of this invention. As such, the various illustrative implementations of the methods and systems are not intended to be limited to the particular forms disclosed. Rather, they include all modifications and alternatives falling within the scope of the claims, and examples other than the one shown may include some or all of the features of the depicted example. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several implementations.

The claims are not intended to include, and should not be interpreted to include, means plus- or step-plus-function limitations, unless such a limitation is explicitly recited in a given claim using the phrase(s) "means for" or "step for," respectively.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for identifying malicious e-mail threats while maintaining privacy of e-mail content, the method comprising:
    generating, by one or more processors, one or more raw models having one or more parameter values configured to classify e-mails as one of a first type and a second type, the first type corresponding to a malicious e-mail and the second type corresponding to a non-malicious e-mail;
    transmitting, by the one or more processors, the one or more raw models to a plurality of remote computing devices, the plurality of remote computing devices including computing devices belonging to different entities;
    receiving, by the one or more processors, first feedback from a first remote computing device of the plurality of remote computing devices and second feedback from a second remote computing device of the plurality of remote computing devices, the first remote computing device associated with a first entity of the different entities and the second remote computing device associated with a second entity of the different entities, wherein the first feedback comprises a first set of one or more modified parameter values generated via training of the one or more raw models by the first remote computing device based on e-mails received by the first entity, wherein the second feedback comprises a second set of one or more modified parameter values generated via training of the one or more raw models by the second remote computing device based on e-mails received by the second entity, and wherein the e-mails received by the first entity are not included in the first feedback and the e-mails received by the second entity are not included in the second feedback;
    generating, by the one or more processors, one or more new parameter values from the first set of one or more modified parameter values included in the first feedback and the second set of one or more modified parameter values included in the second feedback;
    generating, by the one or more processors, one or more updated models having the one or more new parameter values; and
    transmitting, by the one or more processors, the one or more updated models to the plurality of remote computing devices.

2. The method of claim 1, wherein the one or more raw models comprise a B model and an X model, the B model configured to analyze features derived from a body portion of e-mails and the X model configured to analyze outputs of the B model and features derived from at least one of a header portion and a footer portion of the e-mails.

3. The method of claim 1, wherein the generating the one or more new parameter values based on analysis of the first feedback and the second feedback comprises:
    analyzing the first feedback and the second feedback; and
    applying weights to the first feedback and the second feedback, wherein the one or more new parameter values are generated based on the weights applied to the first feedback and the second feedback.

4. The method of claim 3, wherein the plurality of remote computing devices includes a third remote computing device associated with spam house entity, and wherein the method comprises:

receiving third feedback from the third remote computing device; and analyzing the third feedback, wherein the one or more new parameter values are generated, at least in part, based on analysis of the third feedback.

5. The method of claim 4, wherein no weight or a reduced weight is applied to the third feedback.

6. The method of claim 1, further comprising: transmitting a training period message to the plurality of remote computing devices, the training period message identifying a period of time during which the one or more raw models are to be trained by each of the plurality of remote computing devices.

7. The method of claim 6, wherein the first feedback and the second feedback are received following a conclusion of the period of time identified in the training period message.

8. The method of claim 7, further comprising:
receiving a notification from the first remote computing device indicating a triggering event has occurred, wherein the first feedback is received prior to a conclusion of the period of time identified in the training period message; and
transmitting a feedback request message to the second remote computing device in response to receiving the notification from the first remote computing device, the feedback request message comprising a request for the second remote computing device to provide feedback prior to the conclusion of the period of time identified in the training period message, wherein the second feedback is received prior to the conclusion of the period of time identified in the training period message based upon the feedback request message.

9. The method of claim 1, wherein the one or more new parameter values of the one or more updated models are configured to detect malicious e-mails that were included in the e-mails received by the first entity based on the first feedback and the e-mails received by the second entity based on the second feedback.

10. A non-transitory computer-readable storage medium storing instructions that, when executed by one or more processors, cause the one or more processors to perform operations for identifying malicious e-mail threats while maintaining privacy of e-mail content, the operations comprising:
generating, by one or more processors, a B model and an X model, the B model configured to analyze features derived from a body portion of e-mails and the X model configured to analyze outputs of the B model and features derived from at least one of a header portion and a footer portion of the e-mails;
transmitting, by the one or more processors, the B model and the X model to a plurality of remote computing devices, the plurality of remote computing devices including computing devices belonging to different entities;
receiving, by one or more second processors of a first remote computing device of the plurality of remote computing devices, the B model and the X model;
executing, by the one or more second processors, model processor logic against a plurality of e-mails to train the B model and the X model, wherein executing the model processor logic comprises:
deriving candidate features based on a first e-mail of the plurality of e-mails;
evaluating the candidate features to identify features indicative of a malicious e-mail; and
applying at least some of the candidate features to the B model and the X model to label the first e-mail as a malicious e-mail or a safe e-mail;
transmitting, by the one or more second processors, feedback to the one or more processors, wherein the feedback is generated based on training of the B model and the X model;
receiving, by the one or more processors, the feedback from the first remote computing device and second feedback from a second remote computing device of the plurality of remote computing devices, the first remote computing device associated with a first entity of the different entities and the second remote computing device associated with a second entity of the different entities, wherein the feedback is generated via training of the B model and the X model by the first remote computing device based on e-mails received by the first entity, and wherein the second feedback is generated via training of the B model and the X model by the second remote computing device based on e-mails received by the second entity;
updating, by the one or more processors, the B model and the X model based on analysis of the feedback and the second feedback to produce an updated B model and an updated X model; and
transmitting, by the one or more processors, the updated B model and the updated X model to the plurality of remote computing devices.

11. A method for identifying malicious e-mail threats while maintaining privacy of e-mail content, the method comprising:
receiving, by one or more processors, one or more raw models configured to generate feature sets for identifying malicious e-mails, the one or more raw models comprising a set of one or more parameter values;
receiving, by the one or more processors, a plurality of e-mails;
executing, by the one or more processors, model processor logic against the plurality of e-mails to train the one or more raw models, wherein executing the model processor logic comprises:
deriving candidate features based on a first e-mail of the plurality of e-mails;
evaluating the candidate features to identify features indicative of a malicious e-mail; and
applying at least some of the candidate features to the one or more raw models to label the first e-mail as a malicious e-mail or a safe e-mail;
transmitting, by the one or more processors, feedback to a modelling device, wherein the feedback comprises a first set of one or more modified parameter values generated based on training of the one or more raw models, and wherein the plurality of e-mails are not included in the feedback; and
receiving, by the one or more processors, one or more updated models having a second set of one or more parameter values, wherein the second set of one or more parameter values comprise parameter values generated from the first set of one or more modified parameter values included in the feedback and other modified parameter values included in additional feedback received from other entities.

12. The method of claim 11, wherein the one or more raw models comprise a B model and an X model, the B model configured to analyze features derived from a body portion of e-mails and the X model configured to analyze outputs of the B model and features derived from at least one of a header portion and a footer portion of the e-mails.

13. The method of claim 12, wherein a first portion of the candidate features are derived from a body of the plurality of e-mails and a second portion of the candidate features are derived from at least one of headers and footers of the plurality of e-mails, wherein the method comprises:
   training the B model based on at least the first portion of the candidate features; and
   training the X model based on at least the second portion of the candidate features.

14. The method of claim 13, wherein the B model is configured to output information that indicates a likelihood that an e-mail is malicious based on the body of the e-mail, and wherein the X model is configured to label the e-mail based on the information output by the B model and the second portion of the candidate features.

15. The method of claim 11, wherein the second set of one or more parameter values comprises parameter values updated based on other feedback generated by one or more third parties.

16. The method of claim 11, further comprising: receiving a training period message from the modelling device, the training period message identifying a period of time during which the one or more raw models are to be trained.

17. The method of claim 16, wherein the feedback is transmitted to the modelling device following a conclusion of the period of time identified in the training period message.

18. The method of claim 16, further comprising: generating a notification from the first remote computing device indicating a triggering event has occurred, wherein the feedback is transmitted to the modelling device based on the triggering event.

19. The method of claim 11, further comprising transmitting information associated with one or more identified malicious e-mails to a third party entity, wherein the third party entity is a service provider that provides services associated with mitigation of malicious e-mail threats, and wherein the third party entity is different from an entity that controls the modelling device.

20. The method of claim 11, wherein the second set of one or more parameter values of the one or more updated models are configured to detect malicious e-mails that were not included in the plurality of e-mails but were included in other e-mails associated with the other modified parameter values included in the additional feedback.

* * * * *